No. 678,345. Patented July 9, 1901.
G. G. S. MERRY.
WEIGHING, LIFTING, AND GRIP MACHINE.
(Application filed Apr. 30, 1900.)

(No Model.) 4 Sheets—Sheet 1.

WITNESSES.
A. G. Huysman
T. F. Tierney

INVENTOR.
George G. S. Merry
by Herbert W. Jenner.
Attorney.

No. 678,345. Patented July 9, 1901.
G. G. S. MERRY.
WEIGHING, LIFTING, AND GRIP MACHINE.
(Application filed Apr. 30, 1900.)

(No Model.) 4 Sheets—Sheet 2.

WITNESSES. INVENTOR.
George G. S. Merry.
by Herbert W. J. Jenner.
Attorney.

No. 678,345. Patented July 9, 1901.
G. G. S. MERRY.
WEIGHING, LIFTING, AND GRIP MACHINE.
(Application filed Apr. 30, 1900.)
(No Model.) 4 Sheets—Sheet 3.
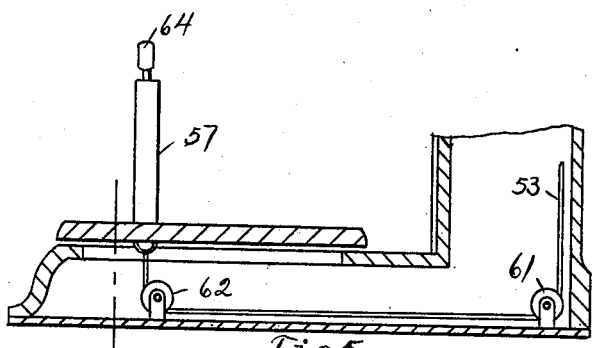
Fig.5.
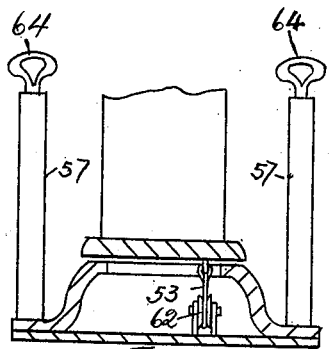
Fig.5a.
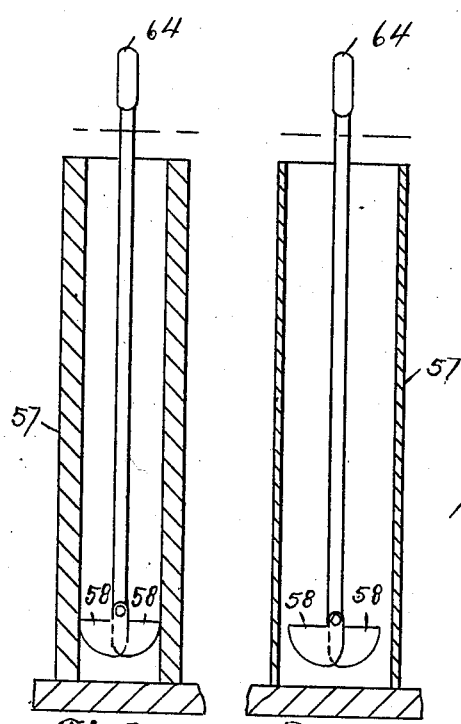
Fig.3. Fig.4.
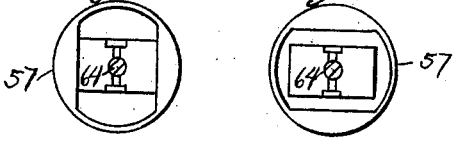
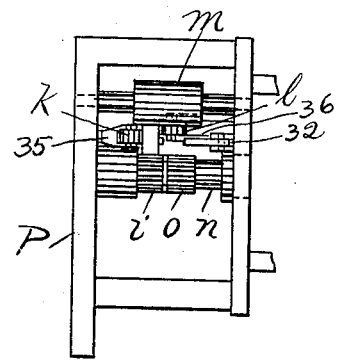
Fig.6.
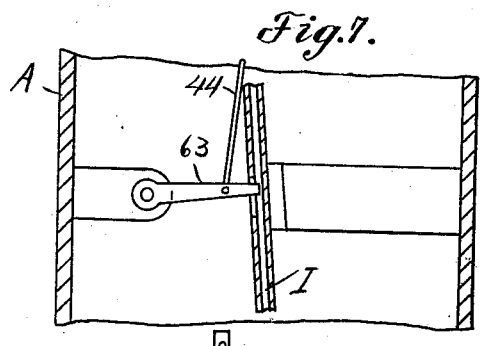
Fig.7. Fig.8.
WITNESSES.
A. G. Huylmun
T. F. Tierney
INVENTOR.
George G. S. Merry.
by Herbert W. Jenner.
Attorney
THE NORRIS PETERS CO., PHOTO-LITHO., WASHINGTON, D. C.

No. 678,345. Patented July 9, 1901.
G. G. S. MERRY.
WEIGHING, LIFTING, AND GRIP MACHINE.
(Application filed Apr. 30, 1900.)
(No Model.) 4 Sheets—Sheet 4.

WITNESSES.
A. G. Heylmun.
T. F. Tierney

INVENTOR.
George G. S. Merry
by Herbert W. Jenner.
Attorney.

UNITED STATES PATENT OFFICE.

GEORGE G. S. MERRY, OF BOSTON, MASSACHUSETTS.

WEIGHING, LIFTING, AND GRIP MACHINE.

SPECIFICATION forming part of Letters Patent No. 678,345, dated July 9, 1901.

Application filed April 30, 1900. Serial No. 14,882. (No model.)

*To all whom it may concern:*

Be it known that I, GEORGE G. S. MERRY, a citizen of the United States, residing at Boston, in the county of Suffolk and State of Massachusetts, have invented certain new and useful Improvements in Automatic Weighing, Lifting, and Grip Machines; and I do hereby declare the following to be a full, clear, and exact description of the invention, such as will enable others skilled in the art to which it appertains to make and use the same.

This invention relates to coin-controlled mechanism used in connection with automatic weighing, lifting, and grip machines; and it consists in the novel construction and combination of the parts hereinafter fully described and claimed.

Figure 1:
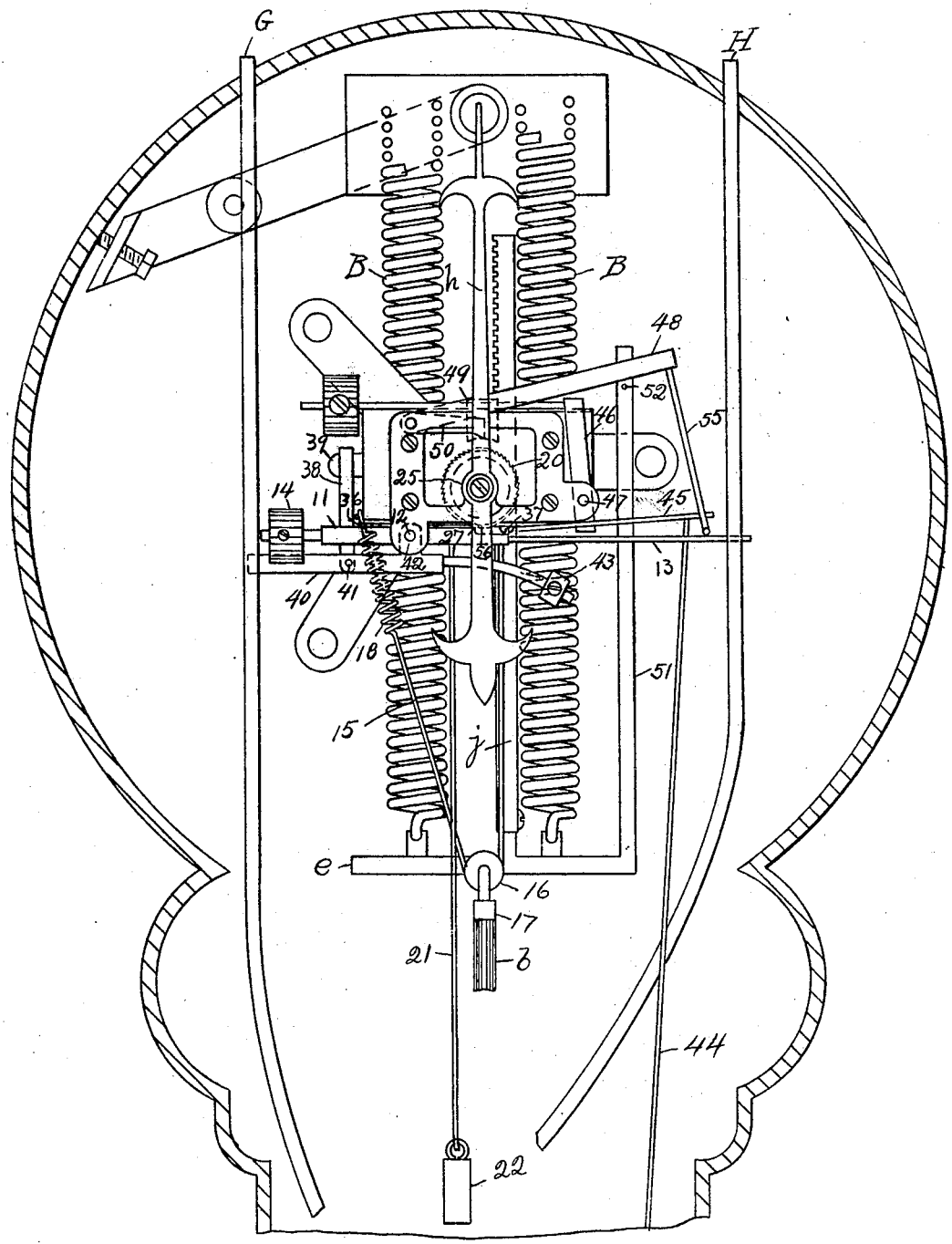
Figure 2:
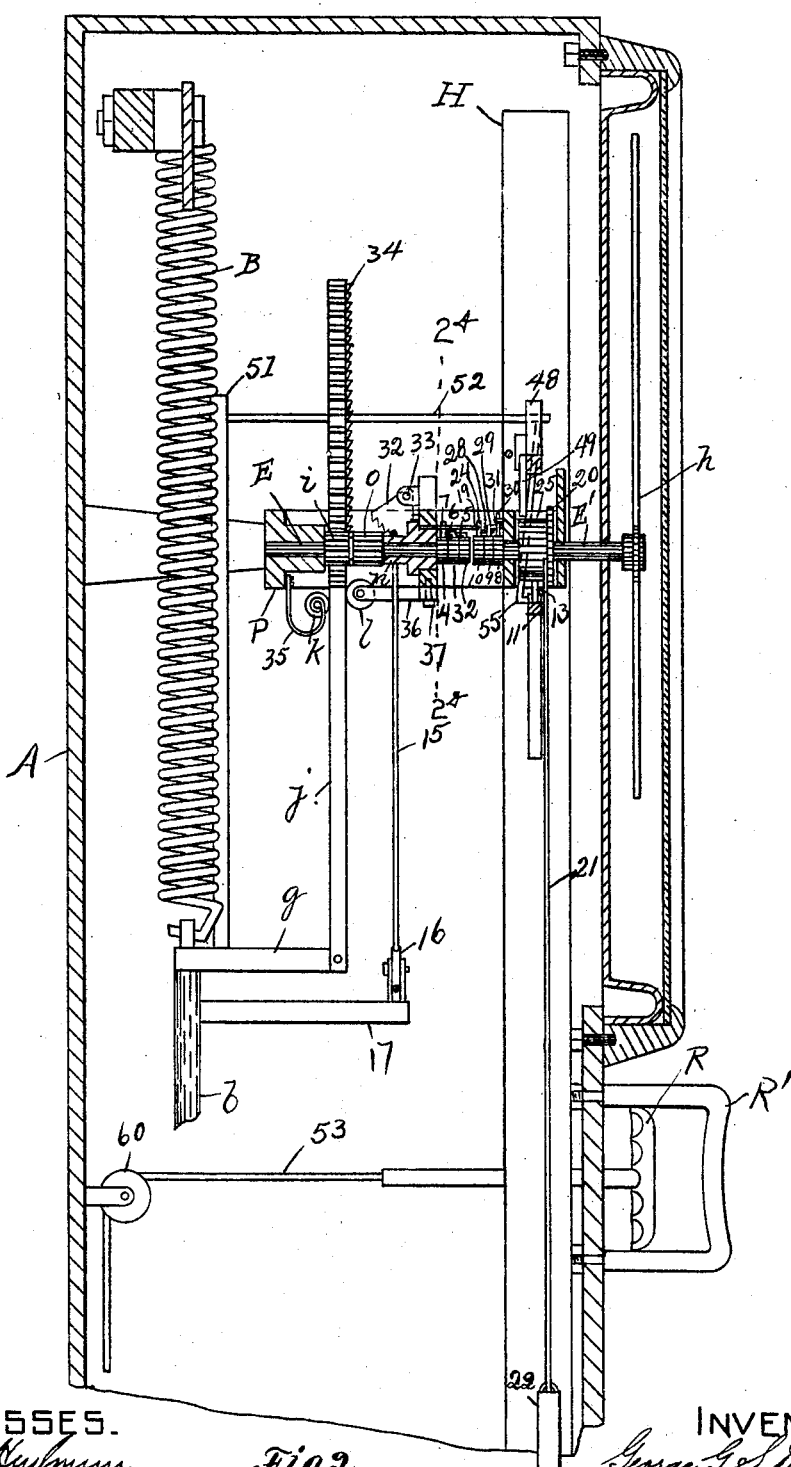
Figure 9:
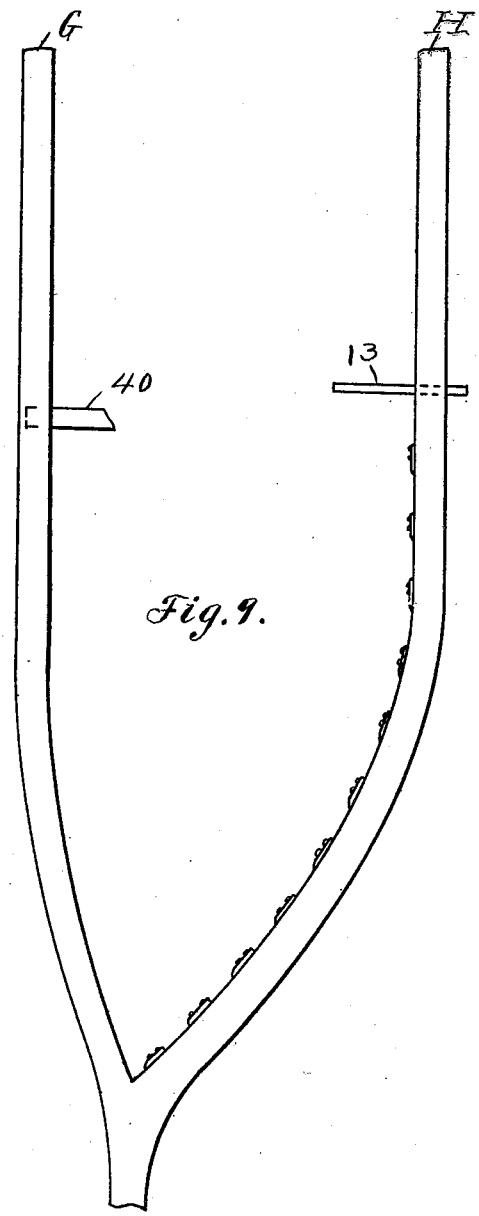
Figure 10:
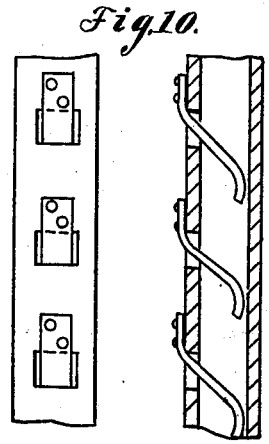
Figure 11:
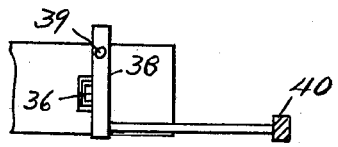

In the drawings, Figure 1 is a front view of the upper part of the operating mechanism. Fig. 2 is a side view of the same. Fig. 3 is a sectional side view and a plan view of one of the lifting-handles and its socket. Fig. 4 shows the same parts as shown in Fig. 3, but with the handle turned a quarter around. Fig. 5 is a vertical section of the lower part of the machine. Fig. 5ª is a cross-section through the same. Fig. 6 is a plan view of the toothed rack and its guide-rollers. Fig. 7 is a side view of the coin-lever and its connections at the lower part of the coin-chute. Fig. 8 is a plan view of the said lever. Fig. 9 is a front view of the two coin-chutes. Fig. 10 is a side view and a vertical section of a part of one of the coin-chutes. Fig. 11 is a detail view of the lever 38.

A is the casing of the machine, which is of the general character of the machine shown in the Patent No. 610,766, issued to me on September 13, 1898, and comprises means for indicating the weight of a person, his lifting power, and the strength of his grip. This machine has a platform at its lower part, which is connected with a vertical actuating-rod $b$ by any approved mechanism, such as a tilting beam. (Not shown.)

B represents the usual springs for weighing, and $e$ is a cross-bar connected to the lower ends of the said springs and to the rod $b$.

A frame P is supported in the casing A, and E is a shaft which is journaled in the frame P. A second shaft E' is also journaled in the frame P and is arranged axially in alinement with the shaft E. The shaft E' carries a pointer $h$, which works in front of a dial in the usual manner. A toothed pinion $i$ is secured on the shaft E, and a similar toothed pinion $o$ is secured on a sleeve $n$, which is journaled on the shaft E. The two said pinions are arranged adjacent to each other, and a single toothed rack $j$ is provided and is arranged to operate both the said pinions. The lower end of the rack $j$ is pivoted to an arm $g$, projecting from the cross-bar $e$, so that the rack may be placed in gear with either pinion, as desired. The spaces between the teeth of the rack and the pinions are made of such width as will permit of the rack engaging with either pinion. When constructed as shown in Fig. 2, the teeth of the rack bear all across the teeth of the pinion $i$. When the rack is placed in gear with the pinion $o$, its teeth are at a slight angle and only the end portions of its teeth bear against the teeth of the pinion $o$; but this is not found to be a serious objection, and it does not prevent the mechanism from being operative. The rack $j$ works vertically between two rollers $k$ and $l$, and the roller $k$ is carried by a spring 35, which presses the rack constantly toward the roller $l$. A third roller $m$ (see Fig. 6) is arranged parallel with the shaft E and holds the rack in gear with the pinion $i$ and the pinion $o$. A looped cord 15 is wound at one end upon the sleeve $n$ and is provided with a spring 18 at its other end, which connects it to the frame P. A roller 16 engages with the loop of the cord 15 and is carried by an arm 17, projecting from the rod $b$.

The shaft E has a collar 4 journaled on it and provided with a radially-projecting pin 7. A collar 3 is also journaled on the shaft E next to the collar 4 and is provided with a lateral projection or fin 6 for engaging with the pin 7. A collar 2 is secured to the shaft E next to the collar 3 and is provided with a fin 5, which engages with the fin 6. The sleeve is provided with a finger 19, which engages with the pin 7 and projects beyond the end of the shaft E.

The shaft E' has a collar 10 secured on its end portion next to the shaft E, and 9 and 8 are collars journaled on the shaft E' between the collar 10 and the frame. The loose collar 8 has a radial pin 30, which bears against a stop-pin 31, which projects from the frame. The loose collar 9 has a fin 29, which engages with the pin 30. The fast collar 10 has a fin 28, which engages with the fin 29, and a radial pin 24, which is engaged by the finger 19, which projects from the sleeve n. A toothed ratchet-wheel 20 and a disk 25, provided with a tooth 56, are also secured upon the shaft E'. A cord 21 is wound on the disk 25 and is provided with a weight 22.

A coin-operated lever 11 is pivoted to the frame P by a pin 12 and is provided with a tooth 27, which normally engages with the tooth 56 and prevents the shaft E' from revolving in one direction. A weight 14 holds the tooth 27 in engagement with the tooth 56 and supports the free end 13 of the lever 11 in the path of a coin which is dropped down the coin-chute H.

Two separate coin-receiving chutes H and G are provided and are operatively connected together at their lower ends, thereby forming a single delivery-chute I, which is common to both chutes H and G. A coin-operated lever 63 (see Fig. 7) is arranged in the path of the coin which slides down the chute I, and this lever 63 is pivoted to the casing A.

A locking-lever 48 is pivoted to the frame P and carries a pawl 50 for engaging with the ratchet-wheel 20 and has also a block 49, which rests on the disk 25 when the pawl is in engagement with the said ratchet-wheel. A bell-crank lever 46 is pivoted to the frame P by a pin 47 and is provided with an arm 45. A cord 44 connects the arm 45 with the lever 63. (See Fig. 7.) A projection 48' on the back of the locking-lever 48 normally comes over the upper end of the lever 46, so that the lever 46 sustains the pawl 50 clear of the teeth of the ratchet-wheel. A rod 51 projects upward from the cross-bar e and is provided with a projecting pin 52, which is arranged under the free end of the lever 48. The free end of the lever 48 is also provided with a downwardly-projecting arm 55, which is arranged over the end portion 13 of the coin-operated lever 11.

The operation of the devices when used for weighing is as follows: When any one steps on the platform, the rod b is pulled downward and the springs B are extended in the usual manner in proportion to the weight of the person. The downward motion of the rod b and its rack j revolves the shaft E positively, and the fin 5 stops at a certain place, according to the weight of the person. The spring 18 is extended by the descent of the sheave 16; but the cord 15 does not revolve the sleeve n, because the finger 19 is bearing against the pin 24, which is secured to the shaft E', and the shaft E' is prevented from revolving by the tooth 27 on the lever 11. When a coin is dropped down the chute H, it depresses the end 13 of the lever 11 and disengages the tooth 27 from the tooth 56. The shaft E' now being free, the sleeve n is revolved by the tension of the spring 18 in the same direction as the shaft E was revolved previously. The sleeve n turns the shaft E' and the pointer h by means of the finger 19 and pin 24 until the said finger 19, pin 7, and fin 6 are stopped by the fin 5. The pointer h then stops in a position proportional to the load on the platform in the same manner as fin 5, and the weight can be read upon the dial. The object of using loose collars and fins on the shafts E and E' is to permit the said shafts to revolve more than once before being stopped. The coin continues to descend the chute H after depressing the lever end 13, and when it arrives in the lower chute I it depresses the lever 63. The lever 63 pulls the cord 44 and turns the bell-crank lever 46 on its pivot 47 until its upper end is clear of the projection 48'. The locking-lever 48 now drops by gravity, and the pawl 50 engages with the ratchet-wheel 20, so that the shaft E' cannot revolve backward, and the pointer is therefore held stationary. This practically prevents the use of the machine twice for one coin. The descent of the locking-lever 48 also prevents the tooth 27 on lever 11 from reengaging with the tooth 56, because the arm 55 prevents the end portion 13 of the coin-operated lever 11 from rising to its normal position. When the person steps off the platform, the rod 51 rises with the rod b, and its pin 52 raises the locking-lever 48 to its normal position, thereby releasing the ratchet-wheel 20 from the pawl 50 and permitting the tooth 27 to reëngage with the tooth 56. The shaft E' is revolved backward to its original position, and the pointer is returned to zero by means of the weight 22. When the shaft E' is revolved forward in the operation of weighing, the cord 21 is wound on the disk 25 and the weight 22 is raised by the action of the spring 18, which revolves the shaft E'. When the locking-lever is raised by the pin 52, the weight 22 descends and revolves the shaft E' backward until the pin 30 strikes the stop-pin 31, which it does when the pointer arrives at the zero-mark on the dial.

Two handles 64 are provided for testing lifting power. These handles are adjustable vertically in hollow uprights 57, which are secured to the base of the machine. (See Figs. 5 and 5ᵃ.) The handles 64 are provided with gripping devices 58 for causing them to engage with the sides of the uprights when partially revolved in them. The handles are raised to a height which is most convenient to a person standing on the platform and are then gripped to the uprights. The lifting power is tested by pulling the handles upward while standing on the platform, and thereby depressing the platform to an additional extent proportional to the force exerted on the handles. The roller l is carried by one arm of a bell-crank lever 36, which is pivoted to the frame P by a pin 37. The roller is moved laterally out of contact with the rack j by the lever 36 when a coin is dropped down the chute G. When the roller $l$ leaves the rack, the spring 35 and roller $k$ push the rack out of gear with the pinion $i$ and into gear with the pinion $o$. A toothed cam 32 is pivoted by a pin 33 to the frame P, and 34 represents teeth on the side of the rack $j$ for engaging with the teeth of the cam. When the handles are pulled upon and the rod $b$ is depressed to an additional extent after placing the rack $j$ in gear with the pinion $o$, the rack $j$ revolves the pinion $o$ and sleeve $n$ to an extent proportional to the pull on the handles, and the sleeve $n$ turns the pointer by means of the finger 19, pin 24, and shaft E', so that the force of the pull can be read on the dial. The spring 18 does not revolve the sleeve $n$ when the rack $j$ is in engagement with the pinion $o$, because the rack then prevents the sleeve from being revolved except when the rack itself is pulled downward by the additional pressure on the platform exerted by pulling upon the handles 64. A coin-operated lever 40 is arranged in the path of a coin in the chute G and is pivoted to a lug 42 on the frame P. A weight 43 is provided for normally holding the lever 40 in the path of the coin. A lever 38 (see Figs. 1 and 11) is pivoted to a pin 39, projecting from the frame P, and engages with one end of the bell-crank lever 36. The lever 38 has a laterally-projecting pin 41, which engages with a hole in the lever 40. When the lever 40 is depressed by a coin in the chute G, it presses down the free end of the pin 41 and turns the lever 38 on its pivot. The lever 38 pushes back one arm of the bell-crank lever 36 and moves the roller $l$ out of contact with the rack $j$. The rack $j$ is forced forward by the spring 35 until the teeth 34 engage with the teeth of the cam 32. The cam permits the rack $j$ to move downward in gear with the pinion $o$ to test the pulling strength. When the person steps off the platform, the rack $j$ rises and raises the toothed cam 32, and the said cam pushes the rack $j$ out of gear with the pinion $o$ and into gear with the pinion $i$. This permits the weight 43 to restore the lever 40 to its normal position in the coin-chute and bring the roller $l$ back again in contact with the rack $j$. The coin in the chute G falls into the chute I after operating the lever 40 and operates the lever 63 in the said chute I, thereby disengaging the locking-lever 48 and preventing the pointer from moving backward, but permitting it to move forward as the handles 64 are pulled upon.

The same locking mechanism is common to the weighing and lifting devices; but it operates at different times. In weighing the locking mechanism operates after the total weight has been applied to the platform and after the lever 11 has been operated. In lifting the locking mechanism is operated before the total weight is applied, and the descent of the locking-lever itself operates the lever 11, and thereby permits the pointer to be moved forward.

Springs 80 are secured to the chute H in the path of the coin between the end 13 of the lever 11 and the lever 63 to retard the descent of the coin and prevent the locking-lever from being operated too quickly after the lever 11.

The mechanism for testing the grip consists of handles R and R'. The handle R slides in a frame and is connected to the platform by means of a wire 53, which runs over guide-sheaves 60, 61, and 62. When the handles are gripped by a person standing on the platform, an additional pressure is applied to the platform and is indicated by the pointer on the dial when a coin is dropped down the chute G in the same manner as in lifting.

What I claim is—

1. The combination, with a spring-supported scale-rod, and a toothed rack rigidly secured to it; of a toothed pinion gearing into the said rack, and a stop for the pointer actuated by the said pinion; a revoluble pointer, actuating mechanism for revolving the said pointer independent of the said pinion, said actuating mechanism being operatively connected with the scale-rod, and a coin-operated locking device which temporarily prevents the pointer from being moved forward after the pointer-actuating mechanism has been actuated by the scale-rod, substantially as set forth.

2. The combination, with a spring-supported scale-rod, and a toothed rack rigidly secured to it; of a toothed pinion gearing into the said rack, and a stop for the pointer actuated by the said pinion; a revoluble pointer, a sleeve and intermediate driving mechanism for revolving the pointer, a cord wound on the said sleeve and provided with a spring for revolving the sleeve and pointer independent of the said pinion, a connection between the said cord and scale-rod whereby the spring is stretched when the scale-rod descends, and a coin-operated locking device which temporarily prevents the pointer from being moved forward by the said spring after the scale-rod has stretched it, substantially as set forth.

3. The combination, with a spring-supported scale-rod, and a toothed rack rigidly secured to it; of two independently-revoluble shafts E and E', a pinion secured on shaft E and gearing into the said rack, a stop for the pointer actuated by the shaft E, a pointer secured on the shaft E', actuating mechanism for revolving the shaft E' operatively connected with the said scale-rod, and a coin-operated locking device which temporarily prevents the shaft E' from being revolved by its said actuating mechanism after the said actuating mechanism has been operated by the scale-rod, substantially as set forth.

4. The combination, with a spring-supported scale-rod, and a laterally-movable toothed rack coupled to the said rod; of two toothed pinions for the said rack to engage with, a revoluble pointer, intermediate driving devices connecting the said pinions with the said pointer independently, and coin-controlled mechanism for moving the said rack laterally, substantially as set forth.

5. The combination, with a spring-supported scale-rod, and a laterally-movable toothed rack coupled to the said rod; of two toothed pinions for the said rack to engage with, a revoluble pointer, intermediate driving devices connecting the said pinions with the said pointer independently, a spring for moving the rack laterally in one direction, means for moving the rack in the reverse direction, and coin-actuated mechanism for controlling the lateral movements of the said rack, substantially as set forth.

6. The combination, with a spring-supported scale-rod, and a laterally-movable toothed rack coupled to the said rod; of two toothed pinions *i* and *o* for the said rack to engage with, coin-controlled mechanism for moving the rack out of gear with pinion *i* into gear with pinion *o*, and a pivoted cam which permits the rack to move downward in gear with pinion *o* and which automatically moves the rack backward into gear with pinion *i* when the said rack is moved upward, substantially as set forth.

7. The combination, with a spring-supported scale-rod, and a toothed rack coupled to the said rod; of two shafts E and E', a toothed pinion secured on shaft E and gearing into the rack, a stop carried by the shaft E, a sleeve journaled on shaft E and provided with means for revolving shaft E' until arrested by the said stop, means for revolving the said sleeve actuated by the said scale-rod; a pointer, a toothed ratchet-wheel, and a disk provided with a tooth, all secured on shaft E'; a coin-operated lever normally engaging with the said tooth and preventing the pointer from moving forward, and a coin-controlled locking device provided with a pawl which engages with the said ratchet-wheel after the coin-operated lever has been operated to free the pointer, substantially as set forth.

8. The combination, with a revoluble pointer, of two separate actuating mechanisms for moving the pointer forward, two receiving-chutes for coins and a single delivery-chute common to the two said chutes, two coin-operated levers connected with the two receiving-chutes and controlling the respective actuating mechanisms, a single coin-operated lever connected with the said delivery-chute and operated subsequently to each of the said two levers, and a locking device for the pointer operatively connected with the said single lever, substantially as set forth.

9. The combination, with a coin-chute, and two coin-operated levers arranged one above the other; of springs connected to the chute between the said two levers and operating to retard the descent of a coin from one lever to the other, substantially as set forth.

10. The combination, with a revoluble pointer, and a toothed ratchet-wheel which revolves with it; of a locking-lever 48 provided with a pawl for engaging with the said ratchet-wheel, two separate actuating mechanisms for moving the pointer forward, two coin-operated levers 11 and 40 controlling the respective mechanisms, a single coin-operated lever 63 operated by a coin falling from either lever 11 or 40, a catch 46 operated by the lever 63 and normally holding up the lever 48, means for preventing the pointer from moving forward controlled by the lever 11, and an arm 55 projecting from the locking-lever 48 and operating the lever 11 when the lever 63 is operated by a coin falling from the lever 40 without the lever 11 having been first operated, substantially as set forth.

In testimony whereof I have affixed my signature in presence of two witnesses.

GEORGE G. S. MERRY.

Witnesses:
 ALICE J. MURRAY,
 FREDK. K. DAGGETT.